No. 741,748. PATENTED OCT. 20, 1903.
G. R. WARD.
PACKAGING MACHINE.
APPLICATION FILED AUG. 6, 1901.
NO MODEL. 14 SHEETS—SHEET 4.

No. 741,748. PATENTED OCT. 20, 1903.
G. R. WARD.
PACKAGING MACHINE.
APPLICATION FILED AUG. 6, 1901.
NO MODEL. 14 SHEETS—SHEET 7.

WITNESSES:
INVENTOR
George R. Ward
BY
ATTORNEY

No. 741,748. PATENTED OCT. 20, 1903.
G. R. WARD.
PACKAGING MACHINE.
APPLICATION FILED AUG. 6, 1901.
NO MODEL. 14 SHEETS—SHEET 9.

WITNESSES:
INVENTOR
George R. Ward
BY
ATTORNEY

No. 741,748. PATENTED OCT. 20, 1903.
G. R. WARD.
PACKAGING MACHINE.
APPLICATION FILED AUG. 6, 1901.
NO MODEL. 14 SHEETS—SHEET 10.

WITNESSES:

INVENTOR
George R. Ward
BY
Emerson R. Newell
ATTORNEY

No. 741,748. PATENTED OCT. 20, 1903.
G. R. WARD.
PACKAGING MACHINE.
APPLICATION FILED AUG. 6, 1901.
NO MODEL. 14 SHEETS—SHEET 11.

WITNESSES: INVENTOR
M. P. Torney Geo. R. Ward
E. R. Vand... BY
E. R. Newell
ATTORNEY

No. 741,748. PATENTED OCT. 20, 1903.
G. R. WARD.
PACKAGING MACHINE.
APPLICATION FILED AUG. 6, 1901.
NO MODEL. 14 SHEETS—SHEET 12.

WITNESSES:
INVENTOR
George R. Ward
BY
ATTORNEY

No. 741,748. PATENTED OCT. 20, 1903.
G. R. WARD.
PACKAGING MACHINE.
APPLICATION FILED AUG. 6, 1901.
NO MODEL. 14 SHEETS—SHEET 14.

WITNESSES:
M. P. Tormey
F. F. Hastings

INVENTOR
George R. Ward
BY
Emerson R. Newell
ATTORNEY

No. 741,748. Patented October 20, 1903.

UNITED STATES PATENT OFFICE.

GEORGE R. WARD, OF NEW YORK, N. Y., ASSIGNOR TO CHARLES F. COBURN, OF BOSTON, MASSACHUSETTS.

PACKAGING-MACHINE.

SPECIFICATION forming part of Letters Patent No. 741,748, dated October 20, 1903.

Application filed August 6, 1901. Serial No. 71,014. (No model.)

*To all whom it may concern:*

Be it known that I, GEORGE R. WARD, a citizen of the United States, residing at New York, N. Y., have invented certain new and useful Improvements in Packaging-Machines, of which the following is a clear, full, and exact description.

My invention relates to a packaging-machine; and my object is to construct a machine which will be automatic, simple, speedy, and accurate.

In the present embodiment shown in the drawings I have provided a vertically-rotating carrier which has a plurality of radially-disposed pockets. The package may be a bag formed outside the machine and automatically inserted in one of the pockets. The carrier is then rotated to bring the pocket and package into an upright position, where it is filled. The end flaps are then folded down and the carrier rotated and the bag discharged.

My invention will be pointed out in the claims.

In the preferred embodiment of my invention shown in the drawings.

Figure 1:
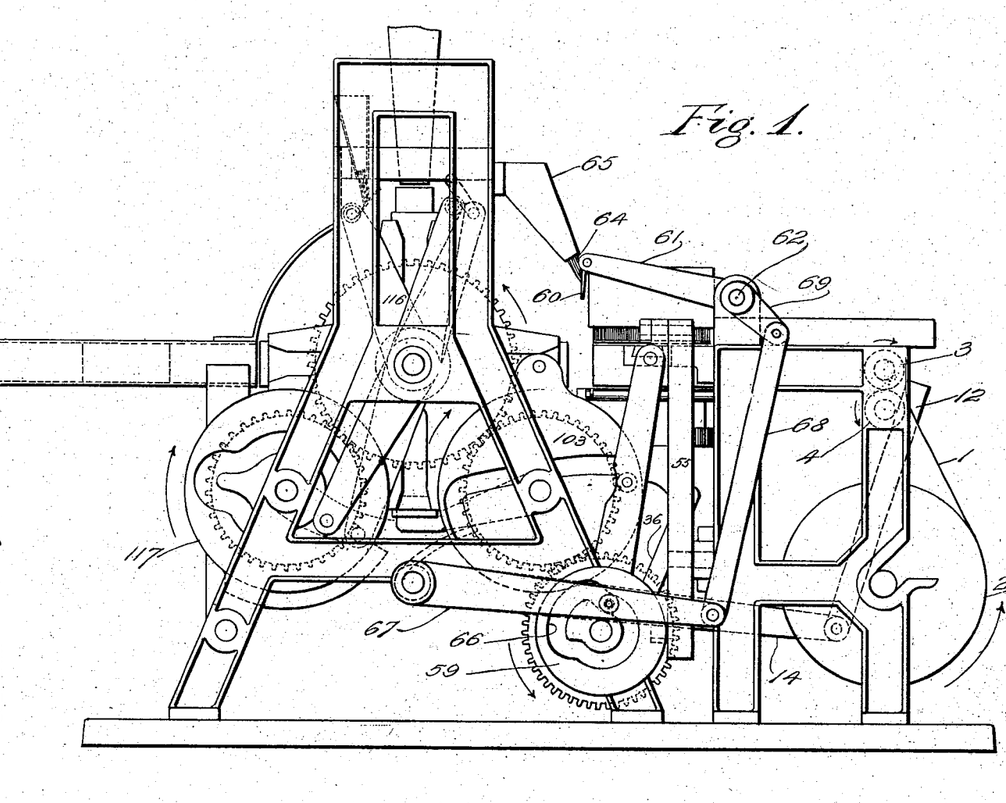
Figure 1 is a side elevation.

In the above preferred embodiment the strip of paper 1 from the roll 2 is drawn between rolls 3 4, rotated as indicated in Fig.
1. These rolls are shown enlarged in Fig. 4 in elevation and in top plan in Fig. 5.

Figure 2:
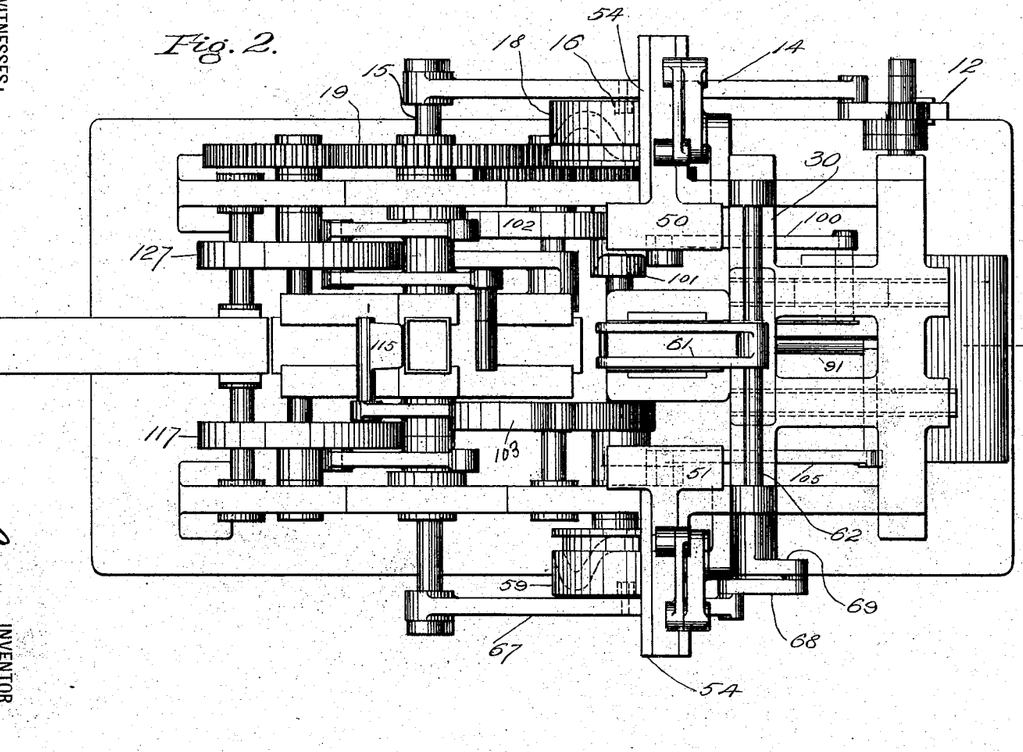
Fig. 2, a top plan view.
Figure 3:
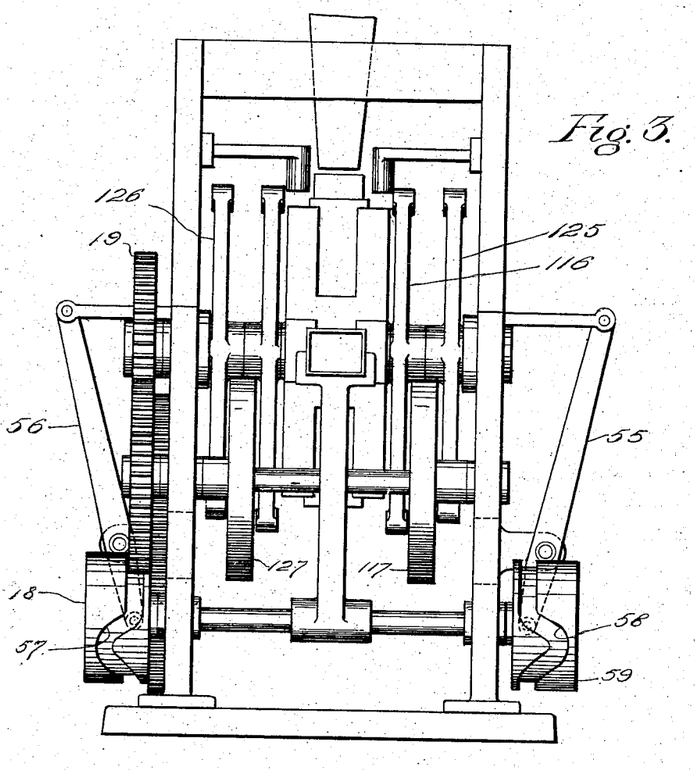
Fig. 3, a front elevation, parts being removed.
Figures 4, 6:
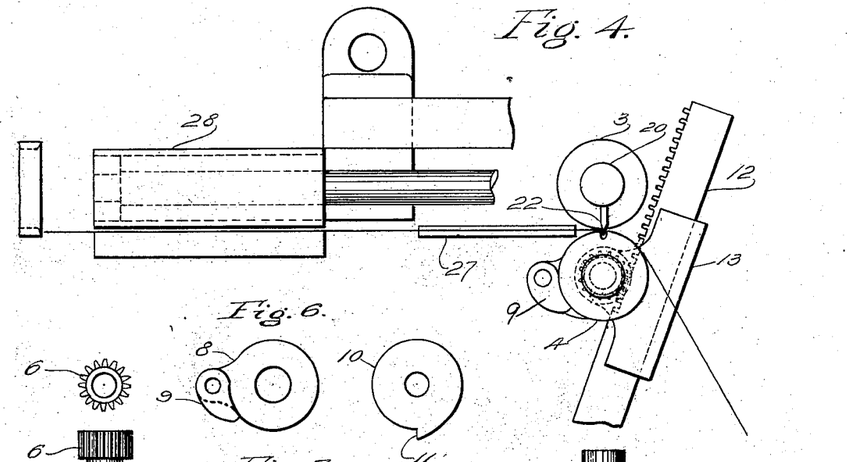
Figs. 4 to 13 show details.
Figures 5, 7, 8, 9, 10:
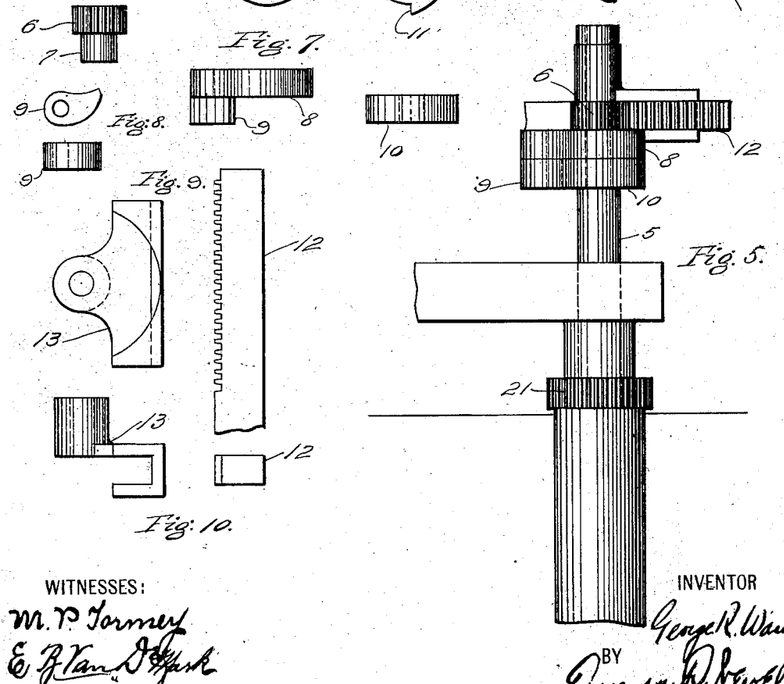
Figure 11:
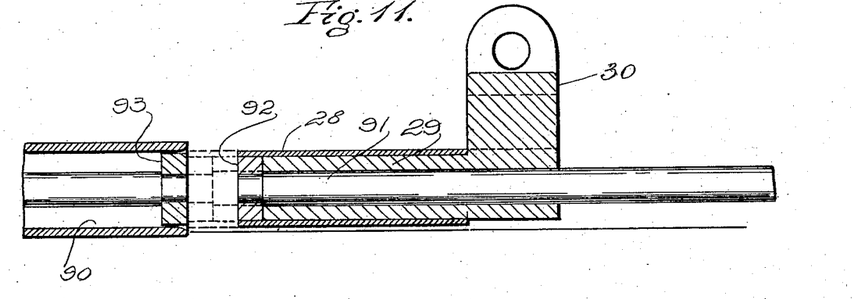
Figure 12:
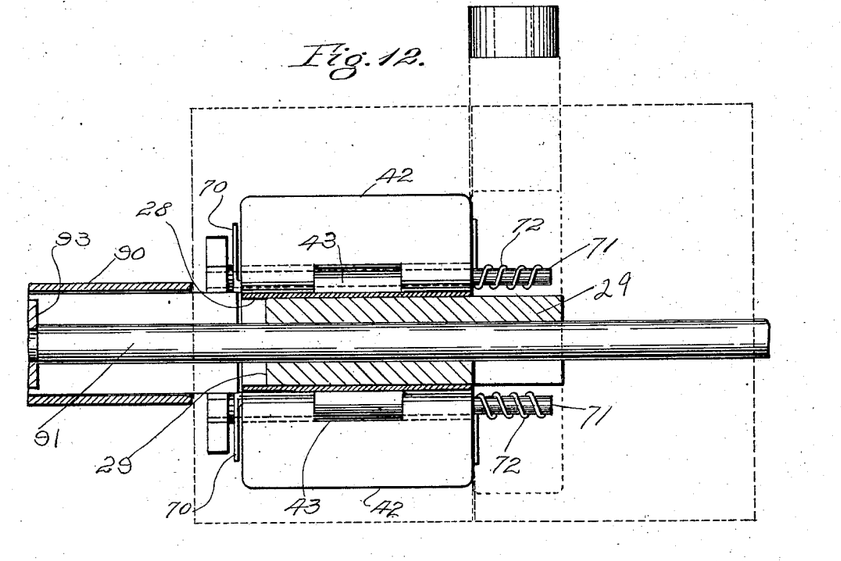
Figure 13:
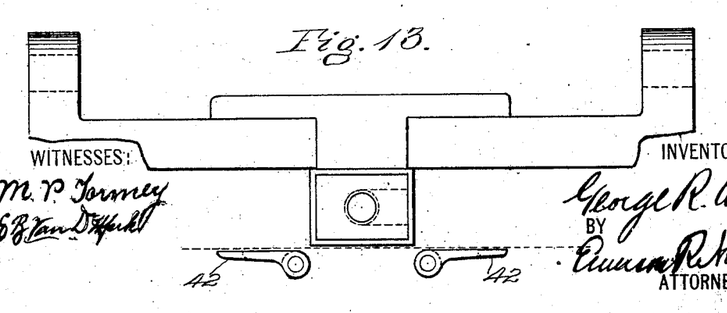
Figures 14, 15, 16, 17, 18, 19:
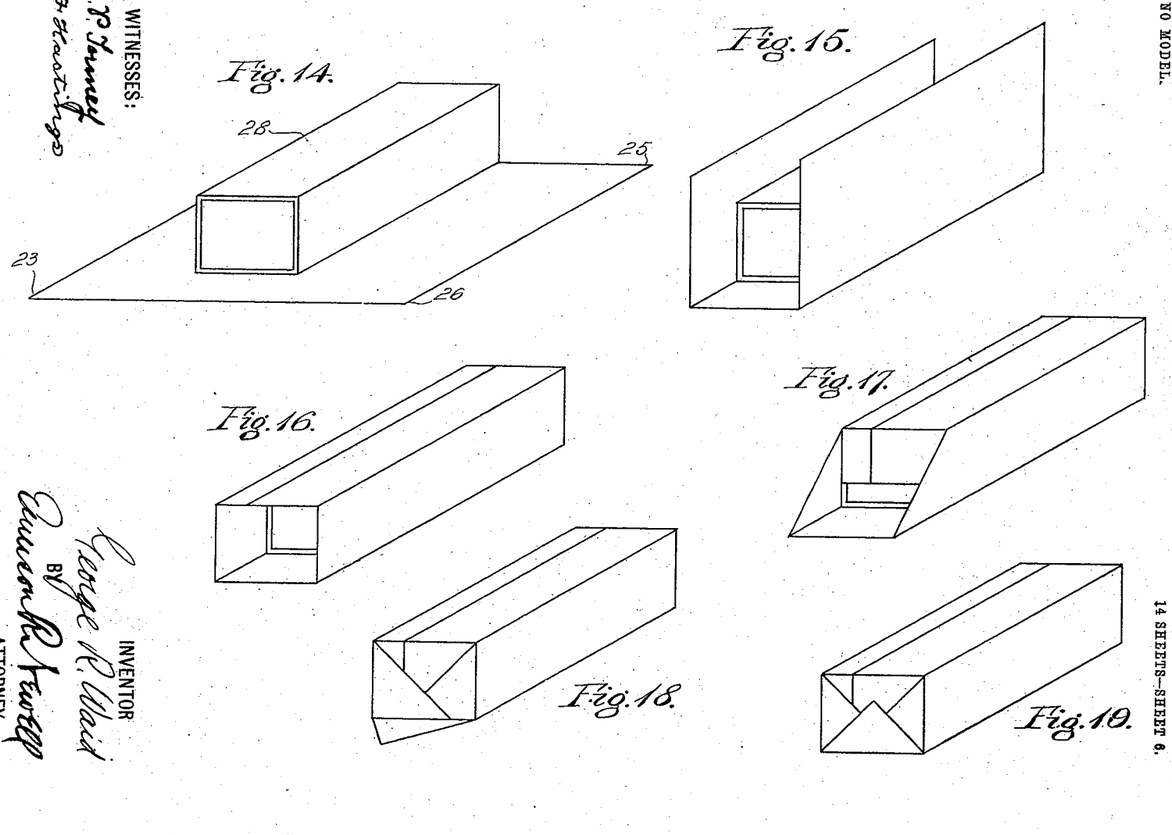
Figs. 14 to 19 are diagrammatic views showing the different steps in forming the bag.
Figure 20:
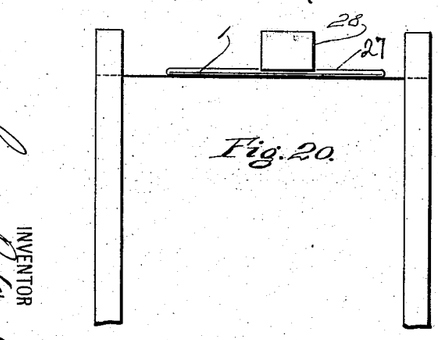
Figs. 20 to 24 show details.
Figure 21:
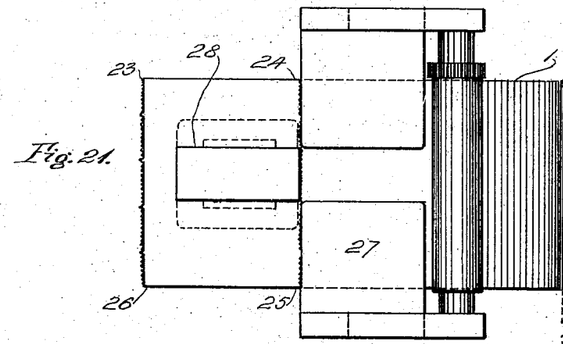
Figure 25:
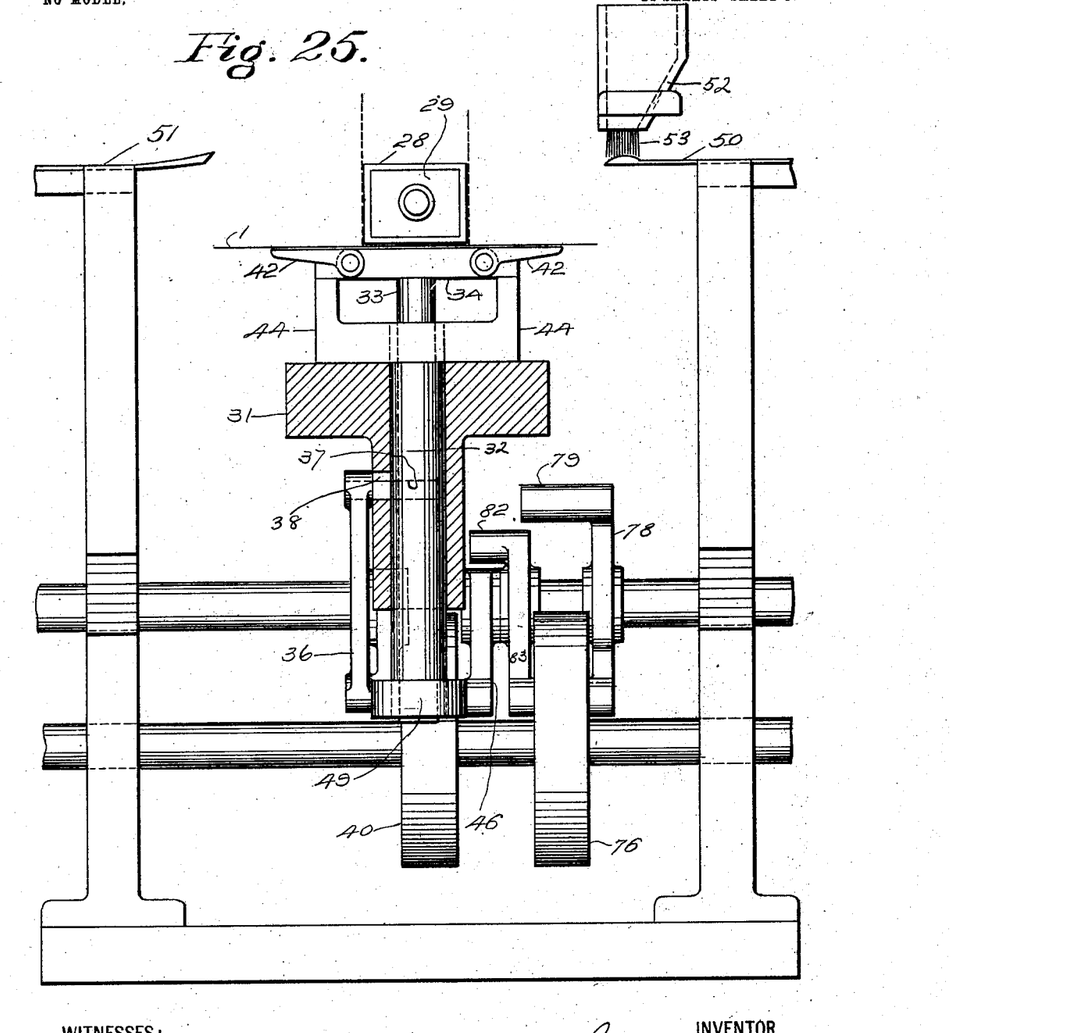
Figs. 25 to 28 show details of mechanism for forming the bag before the bottom of the bag is formed.
Figure 26:
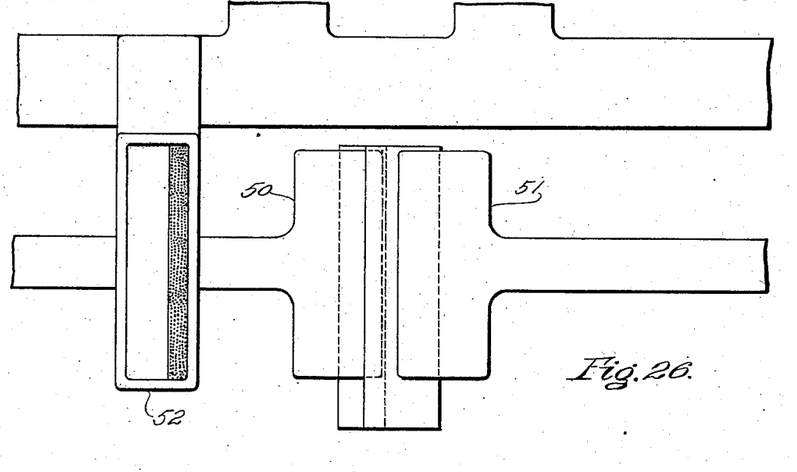
Figure 27:
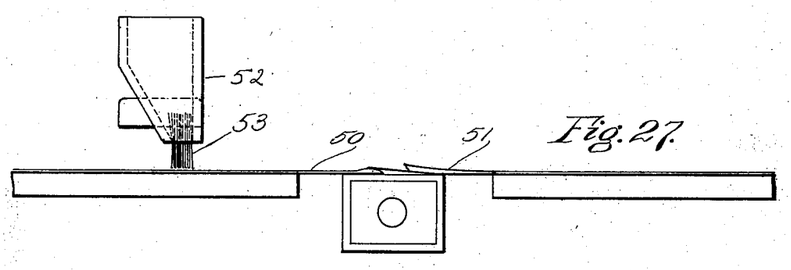
Figure 28:
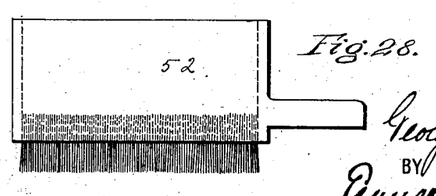
Figures 29, 30:
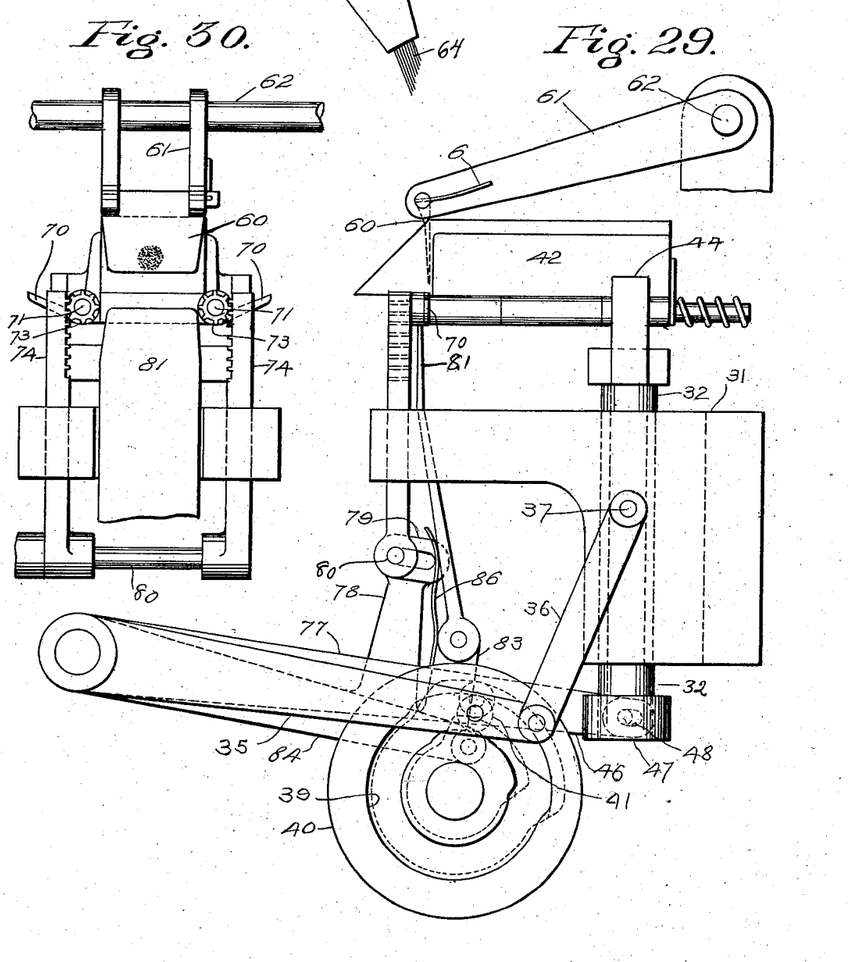
Figs. 29 and 30 are respectively side and front detail views of mechanism for folding in the end laps of the bag to form the bottom.

These rolls are intermittently given one full turn to feed forward and partially separate a piece of the paper strip sufficiently large to form a bag. The lower roll 4 is fixed to a shaft 5, and rotatable on this shaft is a gear-wheel 6, having a cylindrical portion 7, Fig. 7, on which is fixed a disk 8, to which is pivoted a dog 9. A disk 10, having a ratchet-shoulder 11, Fig. 6, is fixed on the lower roll 5, with which this dog 9 may engage. A reciprocating rack 12 slides in a guideway 13 and engages gear-wheel 6. This rack is reciprocated by a lever 14, Figs. 1 and 2, pivoted on shaft 15 and carrying a roller 16, which, Fig. 34, engages a cam-groove 17 in the perpendicular face of a wheel 18, rotated by driving-wheel 19 through suitable gearing. The upper roll 3 is fixed to shaft 20, Fig. 4, and a gear-wheel 21 on shaft 20 engages with a similar gear (not shown) on shaft 5. Roll 4 has a depression in its face into which a knife 22 on the upper roll enters to partially separate a piece of the paper strip, as shown in Fig. 21. When the rack 12 is drawn downward, the rolls are not rotated, as the gear-wheel 6, disk 8, and dog 9 turn freely on shaft 5; but when the rack is pushed upward dog 9 engages shoulder 11 on disk 10 and rotates the rolls one revolution, which will push forward and partially separate a portion 23 24 25 26, Fig. 21, just large enough to form a bag. The strip is fed through a guideway 27, Figs. 20 and 21, formed of a strip of metal having its sides turned over, as shown in Fig. 20, into position 25, as shown, ready to be formed into a bag. The bag is preferably formed by folding it around a shell-form 28, located above the strip, Fig. 25, which is a view from the rear. This shell slides on a fixed squared portion 29, extending forwardly from a cross-piece 30, Figs. 2 and 11, on the frame of the machine. Within a fixed portion 31, Figs. 25 and 29, slides a sleeve 32, and within this sleeve a plunger 33 reciprocates, carrying a head 34, Fig. 25, which holds the paper against the under side of the shell. This plunger 33 is reciprocated by a lever 35, Fig. 29, and link 36, carrying a pin 37, passing through a slot 38 in fixed portion 31 and sleeve 32. This lever 35 is rocked by a cam-groove 39 on wheel 40, Figs. 29 and 35, in which groove is a roller 41, carried on lever 35. When the portion 23 26 has reached the position shown in Fig. 21, the cam 39 raises the lever 35 and plunger 33, pressing the strip between the head 34 and lower portion of shell 28. In order to fold the sides of the bag-strip up into the form shown in Fig. 15 and in dotted lines in Fig. 25, I have in this embodiment provided a pair of wings 42 42, pivoted on shafts 71 71, passing through lugs 43 43 on head 34 and normally thrown down by springs 72 72, as shown in Figs. 12 and 25. The sleeve 32, Fig. 29, carries at its upper end a pair of upwardly-projecting arms 44 44, Fig. 25, which when the sleeve is raised into the position shown in Fig. 29 will turn the wings on their pivots into the vertical position shown in said latter figure, thus folding the strip into the form shown in Fig. 15. This sleeve 32 is raised by means of a cam-groove 45 on wheel 40, Fig. 35, in which groove runs a roller, carried on lever 46, Figs. 25 and 29, which lever carries a pin 47, engaging slot 48 in a head on the lower end of the sleeve. The upright sides of the strip are folded down on top of the shell 28 by two laterally-reciprocating folders 50 51, Figs. 2, 25, 26, and 27. Folder 50 passes under a paste-pot 52 and receives a small quantity of paste on its upper surface from an automatic feed-brush 53 in the bottom of the pot. As the folder 50 slides to the right in Figs. 26 and 27 it folds down one side, and folder 51 then slides out and folds the other side of the strip down upon it, as shown in Figs. 26 and 27, thus receiving paste from the folder 50 and sticking the two sides together when folder 50 is withdrawn. The folder 51 may be made in the form of a spring, as shown, to also press the overlapping edges together. This operation forms the strip into the tube shown in Fig. 16. The folders slide in guideways 54, Fig. 2, and are actuated by levers 55 56, Fig. 3, carrying rollers which engage cam-grooves 57 58 on the faces of wheels 18 59. The bag is preferably formed by then folding in the end of the tube which projects beyond the shell, as shown in Fig. 16, to form the bag-bottom. A plate 60, Figs. 1, 29, and 30, pivoted on an arm 61, which is fixed to a rock-shaft 62, contacts with a brush 64 in paste-pot 65 and is reciprocated by means of cam-grooves 66, Fig. 1, in wheel 59 through a roller on rock-lever 67, link 68, and arm 69, also fixed to rock-shaft 62. The plate 60 is thrown down into the position shown in Figs. 29 and 30, carrying a quantity of paste, and folds one flap down, as shown in Fig. 17. The plate remains in this position until the other flaps are folded upon it, as hereinafter described. Thin folders 70 70, Figs. 29 and 30, pivoted on rock-shafts 71 71, Fig. 12, are located at the forward end of shell 28. Fixed to these folders 70 are pinions 73 73, with which engage reciprocating racks 74 74, Fig. 30. When the racks are pushed upward, the folders 70 are thrown inward and the side flaps are by them folded in, as shown in Fig. 18, against the exposed face of plate 60, which carries the paste. The racks 74 are reciprocated by a cam-groove 75 (shown in dotted lines in Fig. 36) in wheel 76, in which groove runs a roller on rock-lever 77, Fig. 29, which has an upward extension 78, carrying a slotted lateral extension 79, Figs. 25, 29, and 30, in which shaft 80, to which the racks 74 are fixed, is located. The racks slide in suitable guideways, as shown. The remaining triangular flap of Fig. 18 is folded up against the other flaps and against the paste-covered face of plate 60 by a sliding plate 81, Figs. 29 and 30, pivoted to a lateral extension 82, Fig. 25, on upright portion 83, carried on rock-lever 84, which lever carries a roller located in cam-groove 85 in wheel 76, Fig. 36. When this plate 81 is pushed upward, it folds the remaining flap up and through spring 86, Fig. 29, presses the flaps against the paste-covered face of plate 60, which being then withdrawn leaves the bottom flaps securely pasted and pressed together to form the bag-bottom, as shown in Fig. 19. This completes the bag. I am aware that bags or packages may be formed in other ways or by other mechanism, and I therefore do not limit myself to the bag shown nor to the mechanisms above described. The bag is then inserted into a carrier. This carrier 87 is shown in Figs. 22, 23, 39, and 42 and preferably rotates in a vertical plane and has a plurality of pockets, in the present embodiment disposed radially of the axis of rotation, to receive the empty bags. The carrier may be pivoted on trunnions 88 88[a], turning in bushings 89, fixed in the frame of the machine. The carrier being in the position shown in Fig. 39, the bag is inserted into pocket 90, as follows: A plunger 91, carrying a head 92, reciprocates within the fixed extension 29, Figs. 11 and 12, and contacts with the inside of the bag-bottom and pushes the bag to the left into the pocket 90. If the plunger 91 were alone used to acccomplish this, it would probably pull apart the newly-pasted bottom flaps of the bag, and I therefore move the shell 28, along with the plunger, from the position shown in full lines in Fig. 11 to that shown in dotted lines. The bag is thus carried along bodily without danger of having the bottom flaps separated.

Figures 39, 40, 41:
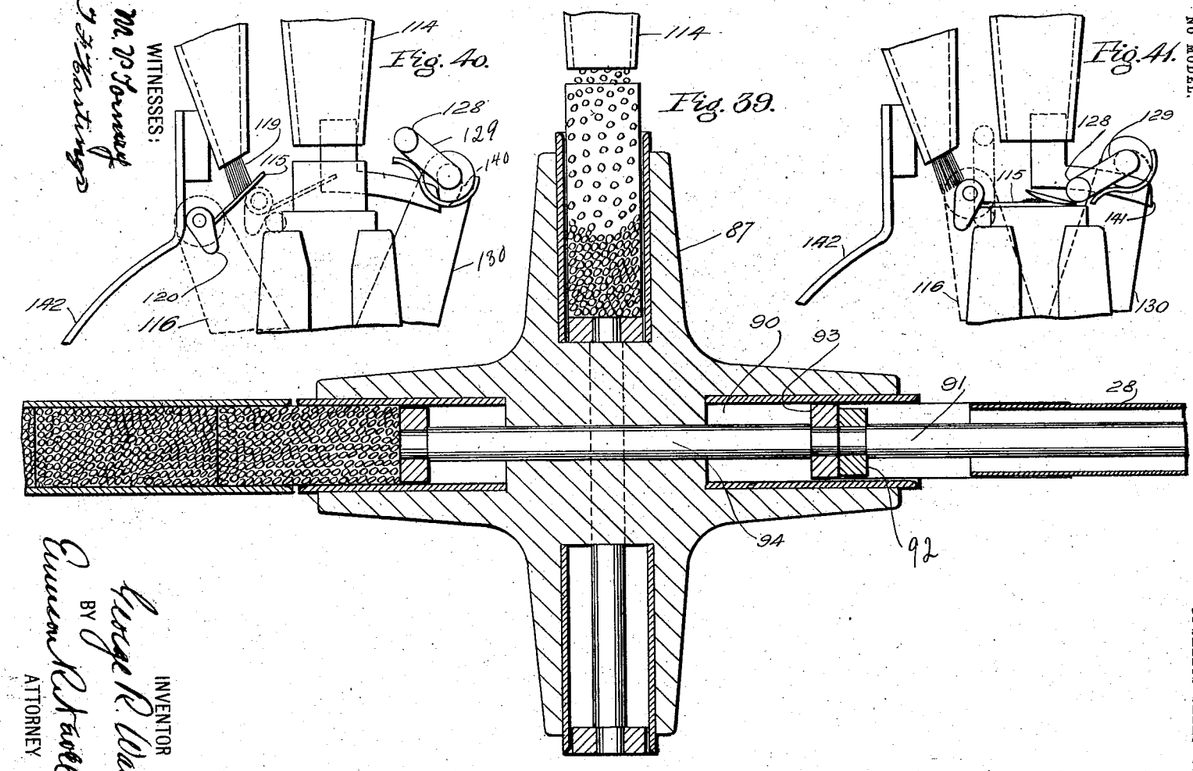
Figs. 39 and 42 are detail views of the carrier in longitudinal and transverse vertical sections, respectively.
Figs. 40, 41, and 43 are details of the mechanism for folding in the end flaps of the bag after it has been filled.
Figure 42:
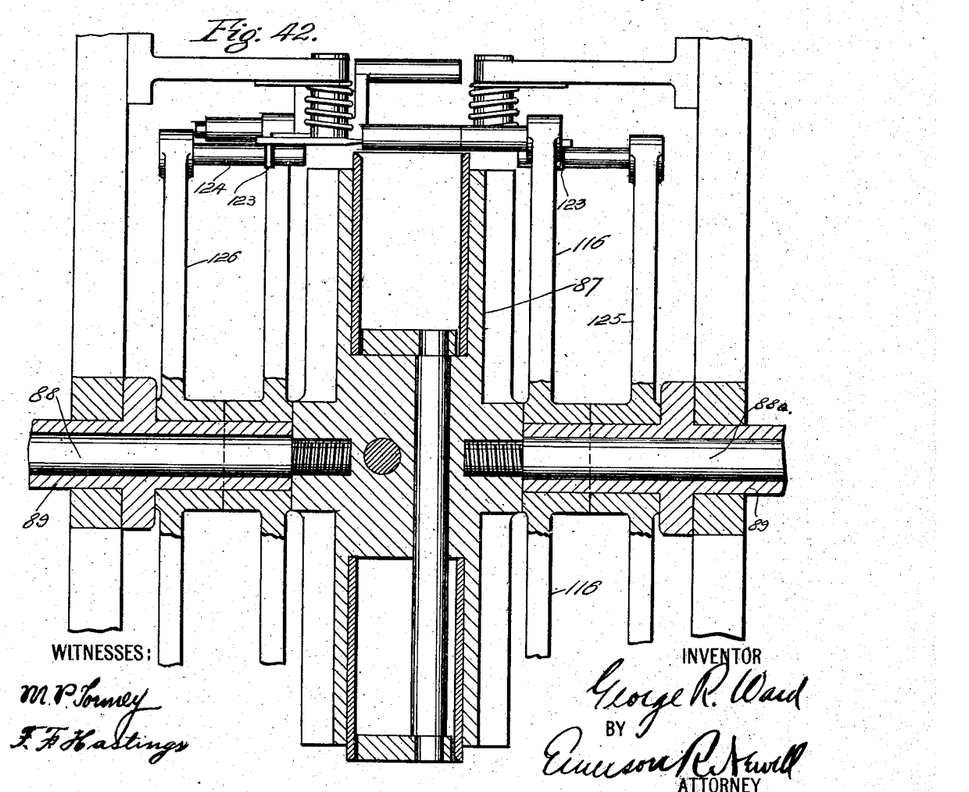

93 is a reciprocating bottom for the pocket 90, which contacts with the outside of the bottom of the bag. I preferably connect the bottom of one pocket with that of another one, so that when one moves in the other moves out, as will be described hereinafter. In the present embodiment the pockets are disposed in pairs opposite to each other, as shown in Fig. 39, and the connection may be a reciprocating rod 94. The bottom 93 being in the position shown in Fig. 11, when the bag is moved up to it the bag-bottom is pressed between the head 92 and bottom 93. The shell is then drawn backward, there being then no danger of separating the bottom flaps. The plunger 91 moves forward, however, pushing the bag into the pocket 90 against the bottom 93 until the rod 94 has pushed the package in the opposite pocket (see Fig. 39) out of the pocket into the chute 95, as will be hereinafter described. The plunger 91 is then withdrawn, the bottom 93 having been forced inward to the end of the pocket, as shown in Fig. 12.

Figures 22, 24:
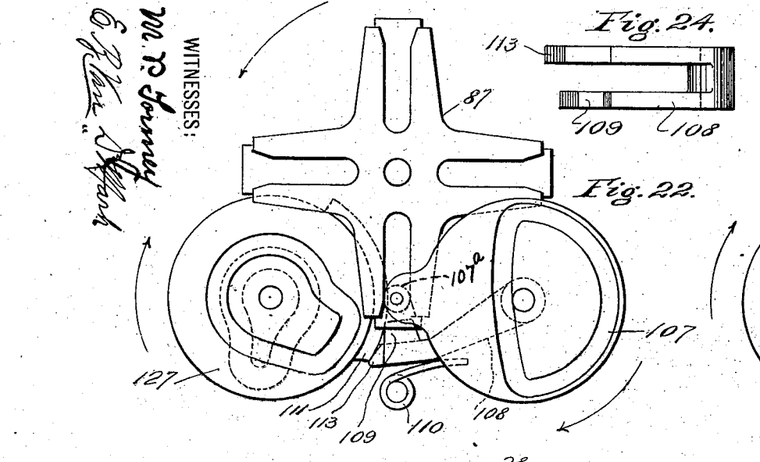
Figure 23:
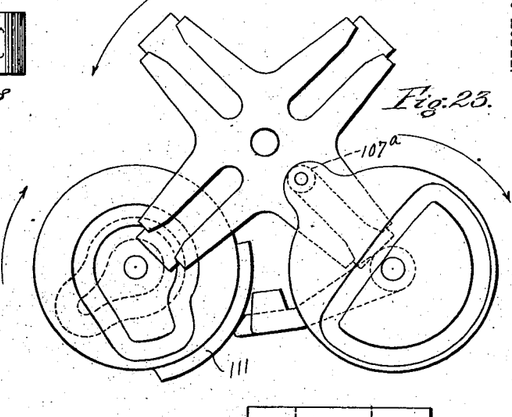
Figure 31:
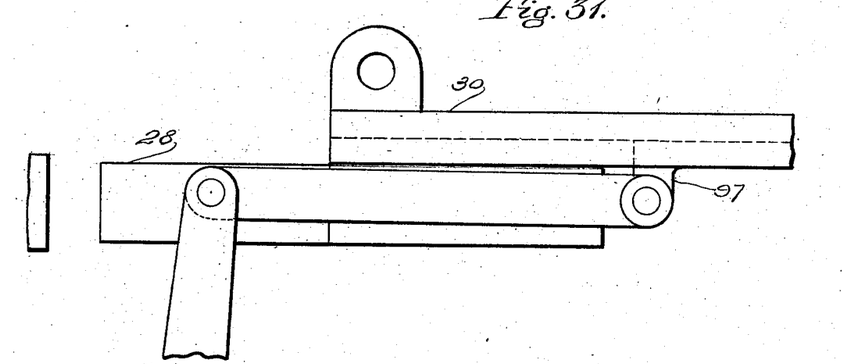
Figs. 31 to 33 are details of the mechanism for inserting the bag into a pocket in the carrier.
Figure 32:
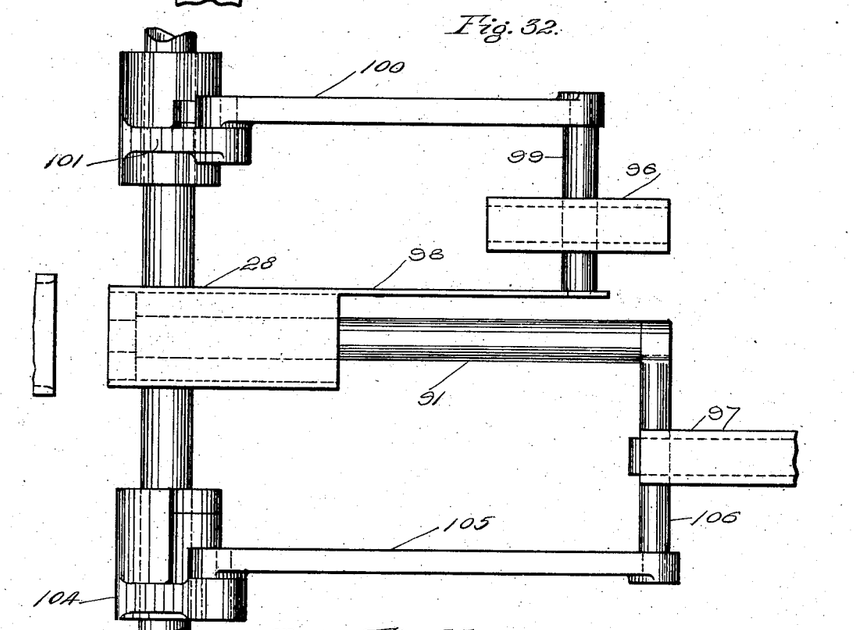
Figure 33:
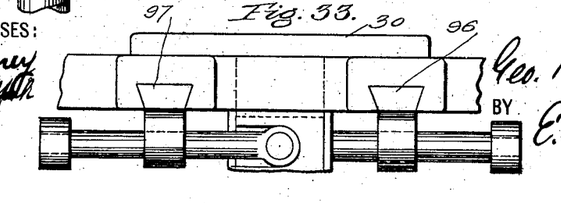

The mechanism for moving the plunger and shell is as follows: Sliding in guideways in the frame are slides 96 97, Figs. 31 to 33. Fig. 33 shows a detail view from the rear. The shell 28 is connected to slide 96 by an extension 98 and a cross-arm 99, to which is pivoted a link 100, which at the other end is pivoted to a rock-lever 101, Fig. 36, carrying a roller located in a cam-groove in wheel 102. Similarly plunger 91 is reciprocated by a cam-groove in wheel 103, Figs. 1 and 35, in which is located a roller on lever 104, connected to slide 97 by link 105 and cross-arm 106. The carrier is then rotated a quarter of a turn to bring the bag into an upright position ready to be filled, as shown in Fig. 39. The carrier is rotated by wheel 107, Fig. 22, which carries a roller 107$^a$, which engages and slides in slots in the carrier, as shown. The carrier is shown in Fig. 23 being rotated to its new position. A locking device to hold the carrier from moving is shown in Figs. 22 and 23. This may be a pivoted lever 108, having a lug 109, which engages each of the pockets in turn. It is pressed upward by spring 110. It is unlocked by means of cam 111 on wheel 127, which strikes projection 113 on the lever and holds the lug out of engagement with the carrier until another pocket comes around.

Figures 34, 35, 36, 37, 38:
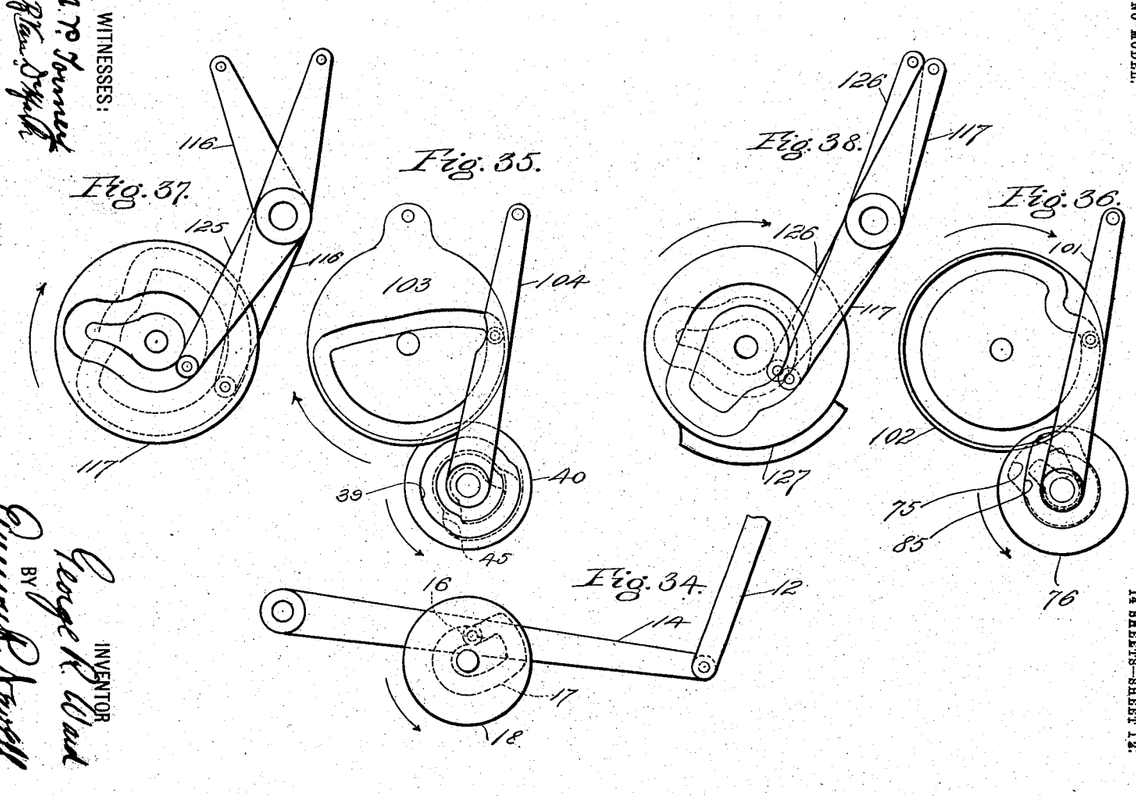
Figs. 34 to 38 show detail views of cams and levers actuated thereby for operating different parts, as hereinafter explained.
Figure 43:
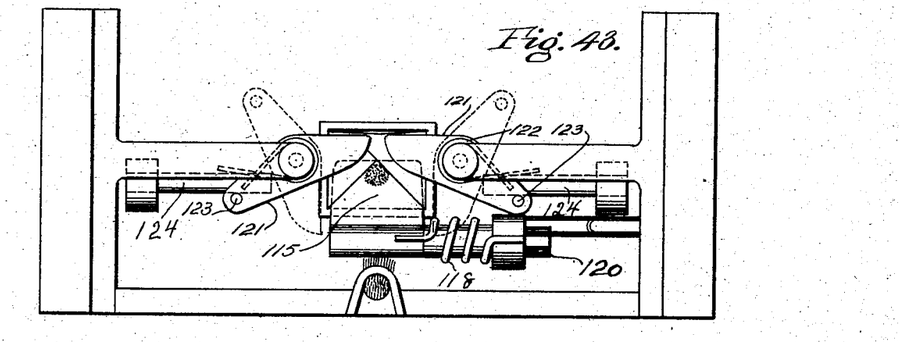

The bag is filled in the upright position by a hopper 114 or otherwise, and in order to close the bag I have provided means to fold in the end portion, and I preferably use the following mechanism: A plate 115, Figs. 40, 41, and 43, is pivoted on a rock-arm 116, which is rocked by a cam-groove in wheel 117, Fig. 37. A spring 118, Fig. 43, normally presses plate 115 against the paste-brush 119. When arm 116 is thrown backward, a lug 120 strikes a part of the frame, as shown in dotted lines in Fig. 40, and plate 115 is thrown down to the position shown in Figs. 41 and 43, folding in one flap, as indicated in Fig. 17. The plate remains in this position until the other folds have been made. The sides are folded in by rocking fingers 121, Fig. 43, pivoted to the frame, and normally thrown into the position shown in dotted lines in Fig. 43 by springs 122. The fingers have pins 123, which are struck by pins 124, projecting from arms 125 126, actuated by cam-grooves in wheels 117 and 127, respectively, Figs. 37 and 38, and fold in the side flaps, as shown in Fig. 43. The remaining triangular flap is folded down on the paste-covered side of the plate 115 by a rounded rod 128, extending laterally from crank-arm 129, pivoted in rock-arm 130. This arm is actuated by a cam-groove in wheel 127, as shown in Fig. 38. A lug 140 on arm 129 strikes projection 141 and throws down the folder 128 into the position shown in Fig. 41 onto the paste on plate 115, and as the plate is then withdrawn the arm 130 by its movement farther forward causes folder 128 to press the pasted folds together. The carrier then rotates another quarter-turn, carrying the bag into the horizontal position opposite its original place. The guard 142, Fig. 40, keeps the folds from separating as the end of the bag slides along it. As a new bag is inserted in a pocket the filled and pasted bag is expelled from its pocket by the bottom of the pocket moving outward.

I am aware that many changes may be made in the constructions herein set forth without departing from my invention, and I therefore do not desire to be limited to the embodiments herein described and illustrated.

What I claim is—

1. In a packaging-machine in combination a carrier having a plurality of pockets, a reciprocating shell form, means to form a bag-tube outside of one of said pockets and around said shell, and folding means to fold down the end flaps of said tube over the end of said shell to form the bag-bottom, means to insert said bag into said pocket including a reciprocating bottom in said pocket and a reciprocating plunger adapted to contact with the inner side of the folded bag-bottom, means to move said shell and plunger forward and cause said plunger to press said bag-bottom against said reciprocating bottom and carry said bag into said pocket, a reciprocating bottom in one of said other pockets and means to move one of said bottoms outwardly as the other moves inwardly, whereby a package may be ejected from one pocket as one is inserted in the other pocket.

2. In a packaging-machine in combination a carrier having a pocket, a reciprocating shell form, means to form a bag-tube outside of said pocket and around said shell, and folding means to fold down the end flaps of said tube to form the bag-bottom, means to insert said bag into said pocket including a reciprocating bottom in said pocket and a reciprocating plunger adapted to contact with the inner side of the bag-bottom, and means to move said shell and plunger to press said bag-bottom against said reciprocating bottom and carry said bag into said pocket.

3. In a packaging-machine in combination a carrier having a pocket, a reciprocating shell form, means to form a bag-tube outside of said pocket and around said shell, and folding means to fold down the end flaps of said tube to form the bag-bottom, means to insert said bag into said pocket including a reciprocating bottom in said pocket and a reciprocating plunger adapted to contact with the inside of the bag-bottom, and means to move said shell and plunger forward and cause said plunger to press said bag-bottom against said reciprocating bottom and carry said bag into said pocket, and means to withdraw said shell as said plunger causes said bag to move into said pocket.

4. In a bag-forming machine in combination, a form around which a sheet of paper is adapted to be folded to form a bag-tube, means to feed a sheet of paper to said form with the ends of said sheet projecting beyond said form, means to hold said sheet of paper against one side of said form, a pivoted arm having a projection, means to apply paste to said projection and means to move the same whereby one end flap of said tube is folded over the end of said form, rocking fingers adapted to fold two of the other end flaps of said bag over upon said projection, and a reciprocating folder to fold the remaining flap down upon said other flaps whereby the bottom of the bag is formed.

5. In a packaging-machine in combination, a carrier having a pair of pockets, a reciprocating form, means to form a bag-tube outside of one of said pockets and around said form, and folding means to fold down the end flaps of said tube over the end of said form to form the bag-bottom, means to insert said bag into said pocket including a reciprocating bottom in said pocket and a reciprocating plunger adapted to contact with the inner side of the folded bag-bottom, means to move said form and plunger forward and cause said plunger to press said bag-bottom against said reciprocating bottom and carry said bag into said pocket, means to move said carrier and pocket, and filling devices to fill said bag through the other end, means to fold over and paste the flaps of said other end of said bag, a reciprocating bottom in the other pocket, and means to move said first bottom outwardly as the other moves inwardly whereby when a bag is inserted in said latter pocket the bottom of said first pocket moves outwardly and presses upon the newly-formed bottom of the bag and ejects the filled package.

6. In a packaging-machine in combination, a vertically-rotating carrier having a pair of pockets, a reciprocating form, means to form a bag-tube outside of one of said pockets and around said form, and folding means to fold down the end flaps of said tube over the end of said form to form the bag-bottom, means to insert said bag into said pocket including a reciprocating bottom in said pocket and a reciprocating plunger adapted to contact with the inner side of the folded bag-bottom, means to move said form and plunger forward and cause said plunger to press said bag-bottom against said reciprocating bottom and carry said bag into said pocket, means to move said carrier and pocket, and filling devices to fill said bag through the other end, means to fold over and paste the flaps of said other end of said bag, a reciprocating bottom in the other pocket, and means to move said first bottom outwardly as the other moves inwardly whereby when a bag is inserted in said latter pocket the bottom of said first pocket moves outwardly and presses upon the newly-formed bottom of the bag and ejects the filled package.

7. In a packaging-machine in combination, a rotating carrier having a pair of radial pockets, a reciprocating form, means to form a bag-tube outside of one of said pockets and around said form, and folding means to fold down the end flaps of said tube over the end of said form to form the bag-bottom, means to insert said bag into said pocket including a reciprocating bottom in said pocket and a reciprocating plunger adapted to contact with the inner side of the folded bag-bottom, means to move said form and plunger forward and cause said plunger to press said bag-bottom against said reciprocating bottom and carry said bag into said pocket, means to move said carrier and pocket, and filling devices to fill said bag through the other end, means to fold over and paste the flaps of said other end of said bag, a reciprocating bottom in the other pocket, and means to move said first bottom outwardly as the other moves inwardly whereby when a bag is inserted in said latter pocket the bottom of said first pocket moves outwardly and presses upon the newly-formed bottom of the bag and ejects the filled package.

8. In a packaging-machine in combination, a carrier having a pair of pockets, a reciprocating form, means to form a bag-tube outside of one of said pockets and around said form, and folding means to fold down the end flaps of said tube over the end of said form to form the bag-bottom, means to insert said bag into said pocket including a reciprocating bottom in said pocket and a reciprocating plunger adapted to contact with the inner side of the folded bag-bottom, means to move said form and plunger forward and cause said plunger to press said bag-bottom against said reciprocating bottom and carry said bag into said pocket, means to move said carrier and pocket, and filling devices to fill said bag through the other end, means to fold over and paste the flaps of said other end of said bag, a reciprocating bottom in the other pocket, and means to move said first bottom outwardly as the other moves inwardly whereby when a bag is inserted in said latter pocket the bottom of said first pocket moves outwardly and presses upon the newly-formed bottom of the bag and ejects the filled package, a chute adapted to receive the ejected packages whereby the folded and pasted ends of successive ejected packages press against each other as the same are ejected.

9. In a packaging-machine in combination, a form around which a sheet of paper is adapted to be folded, a plunger adapted to hold said sheet of paper against one side of said form with said sheet projecting from the same, a pair of wings on opposite sides of said form, a plunger adapted to fold said wings against the sides of said form, a pair of transversely-moving folders at either side of said form, a pasting device adapted to apply paste to one of said folders, means to move said folder across the remaining side of said form and fold down one edge of said paper, and means to move said other folder in the opposite direction across said form whereby the other edge of said sheet is folded down upon said first edge and said first folder, and means to withdraw said first folder before said second folder recedes.

10. In a packaging-machine in combination, a form around which a sheet of paper is adapted to be folded, a plunger adapted to hold said sheet of paper against one side of said form with said sheet projecting from the same, a pair of wings on opposite sides of said form, a plunger adapted to fold said wings against the sides of said form, a pair of transversely-moving folders at either side of said form, a pasting device adapted to apply paste to one of said folders, means to move said folder across the remaining side of said form and fold down one edge of said paper, and means to move said other folder in the opposite direction across said form whereby the other edge of said sheet is folded down upon said first edge and said first folder, and means to withdraw said first folder before said second folder recedes, a second paste-supply device and a reciprocating blade adapted to contact therewith and receive a quantity of paste, means to move the same across the end of said form to fold down one of the end flaps of said sheet over the end of said form, a pair of pivoted fingers beyond the end of said form and close to the end of the same and substantially in the plane of one side thereof, gear-wheels connected with said fingers and racks meshing therewith and adapted to throw said fingers toward each other to fold over the two opposite side flaps of the end of said sheet down upon said folding-blade, and means to fold the remaining flap down on the paste on said blade.

Signed at New York, N. Y., this 29th day of July, 1901.

GEORGE R. WARD.

Witnesses:
EMERSON RETEWELL,
O. P. METCALF.